US011474997B1

(12) United States Patent
Okoshi et al.

(10) Patent No.: US 11,474,997 B1
(45) Date of Patent: Oct. 18, 2022

(54) DISTRIBUTED TRANSACTION SYSTEM AND DISTRIBUTED TRANSACTION PROCESSING METHOD IN DISTRIBUTED TRANSACTION SYSTEM

(71) Applicant: Hitachi, Ltd., Tokyo (JP)

(72) Inventors: Jumpei Okoshi, Tokyo (JP); Masayuki Sakata, Tokyo (JP); Shotaro Noda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/682,201

(22) Filed: Feb. 28, 2022

(30) Foreign Application Priority Data

Sep. 22, 2021 (JP) .............................. JP2021-153818

(51) Int. Cl.
*G06F 16/23* (2019.01)
*G06F 16/27* (2019.01)

(52) U.S. Cl.
CPC ...... *G06F 16/2379* (2019.01); *G06F 16/2365* (2019.01); *G06F 16/27* (2019.01)

(58) Field of Classification Search
CPC ... G06F 16/2379; G06F 16/2365; G06F 16/27
See application file for complete search history.

(56) References Cited

U.S. PATENT DOCUMENTS 10,270,841 B1 * 4/2019 Thomason ............... H04L 69/24
2013/0246368 A1 9/2013 Parkinson et al.
2014/0075019 A1 3/2014 Mordani et al.
2021/0152363 A1 * 5/2021 Li .............................. G06F 16/27
2021/0360083 A1 * 11/2021 Duggal .................... H04L 67/34

FOREIGN PATENT DOCUMENTS

JP 2005-050298 A 2/2005
JP 2015-514247 A 5/2015
JP 2015-534167 A 11/2015

OTHER PUBLICATIONS

Toshiya Onodera, "Transactions in Microservices (Saga)", Teschcore, 2018.

* cited by examiner

*Primary Examiner* — Marcin R Filipczyk
(74) *Attorney, Agent, or Firm* — Mattingly & Malur, PC (57) ABSTRACT

The present invention maintains data consistency of an entire system. A distributed transaction system includes a service information management device that manages a service provided by each device existing in the distributed transaction system, a data consistency strategy management device that manages a data consistency strategy describing a strategy relating to data consistency maintenance in the distributed transaction system, a distributed transaction processing device that executes a distributed transaction, inquires the data consistency strategy management device and the service information management device after the execution of the distributed transaction, and outputs feedback information relating to data consistency maintenance on the basis of the data consistency strategy, the service information, and the execution result. One or more data consistency maintaining devices acquire the feedback information to execute a process relating to the data consistency maintenance.

8 Claims, 12 Drawing Sheets

DATA CONSISTENCY STRATEGY TABLE 500

| ID | TYPE | STRATEGY |
|---|---|---|
| 001 | SAGA | 1: EXECUTION OF SAGA FLOW<br>2: IF HAS SAGA FLOW FAILED?<br>3:    RECONCILE SERVICE CONFIRMATION<br>4:    IF IS RECONCILE SERVICE PRESENT?<br>5:        FEEDBACK INFORMATION OUTPUT |
| 002 | RECONCILE | 1: EXECUTION OF RECONCILE PROCESS<br>2: IF THE NUMBER OF TIMES OF EXECUTION IN LAST ONE YEAR > 10?<br>3:       FEEDBACK INFORMATION OUTPUT |
| ... | ... | ... |

FEEDBACK INFORMATION CONVERSION PROCESS TABLE 600

| TYPE | TARGET | PROGRAM |
|---|---|---|
| SAGA | RECONCILE | PROGRAM001 |
| RECONCILE | USER | PROGRAM002 |
| ... | ... | ... |

601    602    603

PROGRAM

FIG. 7

PROGRAM 001

1: GENERATION OF EMPTY FEEDBACK INFORMATION
2: ACQUISITION OF SAGA FLOW
3: ADDITION OF SAGA FLOW INFORMATION TO FEEDBACK INFORMATION
4: ACQUISITION OF EXECUTION LOG OF SAGA FLOW
5: CONVERSION OF EXECUTION LOG OF SAGA FLOW INTO SAGA FLOW EXECUTION RESULT
6: ADDITION OF SAGA FLOW EXECUTION RESULT TO FEEDBACK INFORMATION

FIG. 9

FEEDBACK INFORMATION 900

| ITEM | CONTENT |
|---|---|
| 901 | 902 |

| ITEM | CONTENT |
|---|---|
| SAGA FLOW | http://aaa.bbb.ccc/sagaFlow1.bpmn |
| 901 | 902 |

EXECUTION LOG OF SAGA FLOW

```
1: 2021/07/11 00:00:01 SagaFlow1  SUCCESS IN LOCAL TRANSACTION 1
2: 2021/07/11 00:00:02 SagaFlow2  SUCCESS IN LOCAL TRANSACTION 1
3: 2021/07/11 00:00:01 SagaFlow1  SUCCESS IN LOCAL TRANSACTION 2
4: 2021/07/11 00:00:01 SagaFlow1  FAILURE IN LOCAL TRANSACTION 3
5: 2021/07/11 00:00:01 SagaFlow1  FAILURE IN COMPENSATION TRANSACTION 2
...
```

| ITEM | CONTENT |
|---|---|
| SAGA FLOW | http://aaa.bbb.ccc/sagaFlow1.bpmn |
| SAGA EXECUTION RESULT | {<br>  LOCAL TRANSACTION 1: SUCCESS,<br>  LOCAL TRANSACTION 2: SUCCESS,<br>  LOCAL TRANSACTION 3: FAILURE,<br>  COMPENSATION TRANSACTION 2: FAILURE<br>} |
| 901 | 902 |

FIG. 10

SERVICE INFORMATION MANAGEMENT TABLE 1000

| TYPE | SERVICE NAME | IP |
|---|---|---|
| SAGA | SAGA001 | 10.0.0.1 |
| RECONCILE | RECONCILE001 | 10.0.0.2 |
| ... | ... | ... |

DATA CONSISTENCY STRATEGY EXECUTION RESULT TABLE 1100

| STRATEGY ID | THE NUMBER OF TIMES OF EXECUTION | THE NUMBER OF TIMES OF MANUAL INTERVENTION | AVERAGE RECOVERY TIME | SAGA EXECUTION RESULT |
|---|---|---|---|---|
| 001 | 56 | 15 | 1.5h | [ {<br>LOCAL TRANSACTION 1: SUCCESS<br>LOCAL TRANSACTION 2: SUCCESS<br>LOCAL TRANSACTION 3: FAILURE<br>COMPENSATION TRANSACTION 2: FAILURE<br>},<br>{... |
| 002 | 46 | 9 | 2.0h | |
| ... | ... | ... | ... | |
| 1101 | 1102 | 1103 | 1104 | 1105 |

FIG. 12

HIGHER DATA CONSISTENCY STRATEGY TABLE 1200

| ID | STRATEGY |
|---|---|
| 101 | 1: ACQUISITION OF DATA CONSISTENCY STRATEGY EXECUTION RESULT<br>2:  IF 10 TIMES OR MORE OF MANUAL INTERVENTION & 1.0 OR MORE OF AVERAGE RECOVERY TIME?<br>3:     AGGREGATION OF SAGA FLOW EXECUTION RESULT<br>5:     FEEDBACK INFORMATION OUTPUT |
| ... | ... |
| ... | ... |

DATA CONSISTENCY STRATEGY MANAGEMENT SCREEN 1300

DATA CONSISTENCY STRATEGY EDITING SCREEN 1301

| ID | TYPE | STRATEGY |
|---|---|---|
| 001 | SAGA | 1: EXECUTION OF SAGA FLOW<br>2: IF HAS SAGA FLOW FAILED?<br>3:   RECONCILE SERVICE CONFIRMATION<br>4:   IF IS RECONCILE SERVICE PRESENT?<br>5:      FEEDBACK INFORMATION OUTPUT |
| 002 | RECONCILE | 1: EXECUTION OF RECONCILE PROCESS<br>2: IF THE NUMBER OF TIMES OF EXECUTION IN LAST ONE YEAR > 10?<br>3:      FEEDBACK INFORMATION OUTPUT |
| ... | ... | ... |

FEEDBACK CONVERSION PROCESS EDITING SCREEN 1302

| TYPE | TARGET | PROGRAM |
|---|---|---|
| SAGA | RECONCILE | PROGRAM001 |
| RECONCILE | USER | PROGRAM002 |
| ... | ... | ... |

| PROGRAM001 | /file/path/program001 | UPLOAD |

REGISTER

FIG. 14

DISTRIBUTED TRANSACTION SYSTEM AND DISTRIBUTED TRANSACTION PROCESSING METHOD IN DISTRIBUTED TRANSACTION SYSTEM

CROSS-REFERENCE TO RELATED APPLICATION

The present application claims priority from Japanese application JP2021-153818, filed on Sep. 22, 2021, the contents of which is hereby incorporated by reference into this application.

BACKGROUND

The present invention relates to a distributed transaction system and a distributed transaction processing method in the distributed transaction system.

The market for microservice architectures is expected to grow due to the trend of cloud native and agile development. On the other hand, the complexity of distributed transactions (namely, the maintenance of data consistency between microservices) in a microservice environment has become a technical problem.

In a system assuming the cloud native, data consistency maintenance is required, as an idea of data consistency, in application implementation, which is called a Saga pattern (workflow management of transactions). Therefore, it is necessary to implement an application for the process carried out by middleware in the past, and comprehensive support before, during, and after the execution of a distributed transaction process is required.

Here, the Saga pattern is a technique for managing distributed transactions as a series of local transactions executed by a plurality of (micro) services. In other words, the Saga pattern is a technique for maintaining data consistency across (micro) services by the workflow of local transactions. In the Saga pattern, in the case where any local transaction fails, a compensating transaction cancels the previous process (see, for example, https://www.techscore.com/blog/2018/12/05/saga-in-microservices/). The Saga pattern mainly has two types: the Orchestration type where a specific service manages the workflow and the Choreography type where a specific service does not manage the workflow. Hereinafter, it is assumed that the distributed transaction system in the specification uses an Orchestration-type Saga pattern unless otherwise noted.

In addition, a process called Reconcile is known as a distributed transaction process in a microservice environment. The Reconcile is a data matching process or a process for correcting data inconsistency by matching, and is a process for correcting data inconsistency by executing a data matching process for Saga that has failed for some reason in the context of a distributed transaction.

Regarding the data consistency maintenance in a distributed transaction system, there are techniques disclosed in Japanese Unexamined Patent Application Publication (Translation of PCT Application) No. 2015-514247, Japanese Unexamined Patent Application Publication (Translation of PCT Application) No. 2015-534167, and Japanese Unexamined Patent Application Publication No. 2005-50298. The technique disclosed in Japanese Unexamined Patent Application Publication (Translation of PCT Application) No. 2015-514247 determines the commitment/rollback of an in-doubt transaction by matching the in-doubt transaction with recovery information, the technique disclosed in Japanese Unexamined Patent Application Publication (Translation of PCT Application) No. 2015-534167 discovers, constructs, and provides an appropriate service in a cloud environment on the basis of a service definition package, and the technique disclosed in Japanese Unexamined Patent Application Publication No. 2005-50298 sends a transaction to a different node in advance on the basis of a rule table to continue a process in the different node when a fault occurs.

SUMMARY

A feedback system can be constructed by outputting information necessary for the Reconcile by the technique disclosed in Japanese Unexamined Patent Application Publication (Translation of PCT Application) No. 2015-514247 and constructing a Saga orchestrator service and a Reconcile service by the technique disclosed in Japanese Unexamined Patent Application Publication (Translation of PCT Application) No. 2015-534167. In addition, a transaction process is sent to a different node in advance by the technique disclosed in Japanese Unexamined Patent Application Publication No. 2005-50298 so that the process can be continued even when a fault occurs.

However, in an environment where nodes with different roles such as Saga and Reconcile are mixed and the presence or absence of the existence of each node is not determined in advance, these technologies cannot be applied to a need to autonomously and distributedly implement a strategy according to the role of each node and to construct an appropriate feedback system according to the system configuration.

The present invention has been made in view of the above circumstances, and an object thereof is to provide a distributed transaction system and a distributed transaction processing method in the distributed transaction system that can maintain the data consistency of the entire system by maintaining consistent data consistency (appropriately linking existing services with each other) while maintaining loose coupling between services on which each data consistency maintaining technique is implemented (=not assuming the existence of the other party).

In order to solve the above-described problem, one aspect of the present invention provides a distributed transaction system that is configured using one or more devices and a network communicatively connecting the devices to each other and provides distributed transactions between the devices, the system including: a service information management device that manages a service provided by each device existing in the distributed transaction system; a data consistency strategy management device that manages a data consistency strategy describing a strategy relating to data consistency maintenance in the distributed transaction system; a distributed transaction processing device that executes a distributed transaction, inquires the data consistency strategy management device and the service information management device after the execution of the distributed transaction, and outputs feedback information relating to data consistency maintenance on the basis of the data consistency strategy, the service information, and the execution result; and one or more data consistency maintaining devices that acquire the feedback information to execute a process relating to the data consistency maintenance.

According to the present invention, it is possible to realize a distributed transaction system and a distributed transaction processing method in the distributed transaction system that can maintain the data consistency of the entire system by maintaining consistent data consistency (appropriately linking existing services with each other) while maintaining loose coupling between services on which each data consistency maintaining technique is implemented (=not assuming the existence of the other party).

DETAILED DESCRIPTION

Hereinafter, an embodiment of the present invention will be described with reference to the drawings. It should be noted that the embodiment to be described below does not limit the invention according to the claims, and all of the elements and combinations thereof described in the embodiment are not necessarily essential to the solving means of the invention.

It should be noted that in the following description, a "memory" refers to one or more memories, and may be typically a main storage device. At least one memory in the memory unit may be a volatile memory or a nonvolatile memory.

In addition, a "processor" is one or more processors in the following description. At least one processor is typically a microprocessor such as a CPU (Central Processing Unit), but may be any other type of processor such as a GPU (Graphics Processing Unit). At least one processor may be single-core or multi-core. In the following description, a CPU will be described as a representative example of the processor, but the processor is not limited to the CPU as described above.

In addition, at least one processor may be a processor in a broad sense such as a hardware circuit (for example, an FPGA (Field-Programmable Gate Array) or an ASIC (Application Specific Integrated Circuit)) that performs some or all of the process.

In the present disclosure, a storage device (storage) includes one storage drive such as an HDD (Hard Disk Drive) or an SSD (Solid State Drive), a RAID device including a plurality of storage drives, and a plurality of RAID devices. In addition, in the case where the drive is an HDD, for example, an SAS (Serial Attached SCSI) HDD may be included, and an NL-SAS (Near Line SAS) HDD may be included.

In addition, although information for obtaining an output to an input may be described by an expression such as "xxx table" in the following description, this information may be data of any structure or may be a learning model such as a neural network for generating an output to an input. Therefore, the "xxx table" can be referred to as "xxx information".

In addition, in the following description, the configuration of each table is an example, one table may be divided into two or more tables, and all or some of two or more tables may be one table.

In addition, although a process may be described with a "program" as the subject in the following description, the subject of the process may be a program because the program is executed by a processor to perform a predetermined process while appropriately using a storage resource (for example, a memory) and/or a communication interface device (for example, a port). The process described with a program as the subject may be performed by a processor or a computer having a processor.

It should be noted that in the case where the operation main body is described as "oo unit" in the following description, it means that a processor of an information processing device configuring a storage system reads and loads the processing content of the "oo unit" that is a program stored in a memory to realize functions (to be described later in detail) of the "oo unit".

The program may be installed in a device such as a computer, for example, a program distribution server or a computer readable (for example, non-temporary) recording medium. In addition, in the following description, two or more programs may be realized as one program, or one program may be realized as two or more programs.

It should be noted that in the drawings for explaining the embodiment, portions having the same functions are denoted by the same reference numerals, and the repeated description thereof is omitted.

In addition, in the following description, reference numerals (or common reference numerals among the reference numerals) may be used when elements of the same kind are not distinguished from each other, and identification numbers (or reference numerals) of elements may be used when elements of the same kind are distinguished from each other.

The positions, sizes, shapes, ranges, and the like of constitutional elements shown in the drawings do not represent actual positions, sizes, shapes, ranges, and the like in some cases in order to easily understand the invention.

Therefore, the present invention is not necessarily limited to the positions, sizes, shapes, ranges, and the like disclosed in the drawings.

Figure 1:
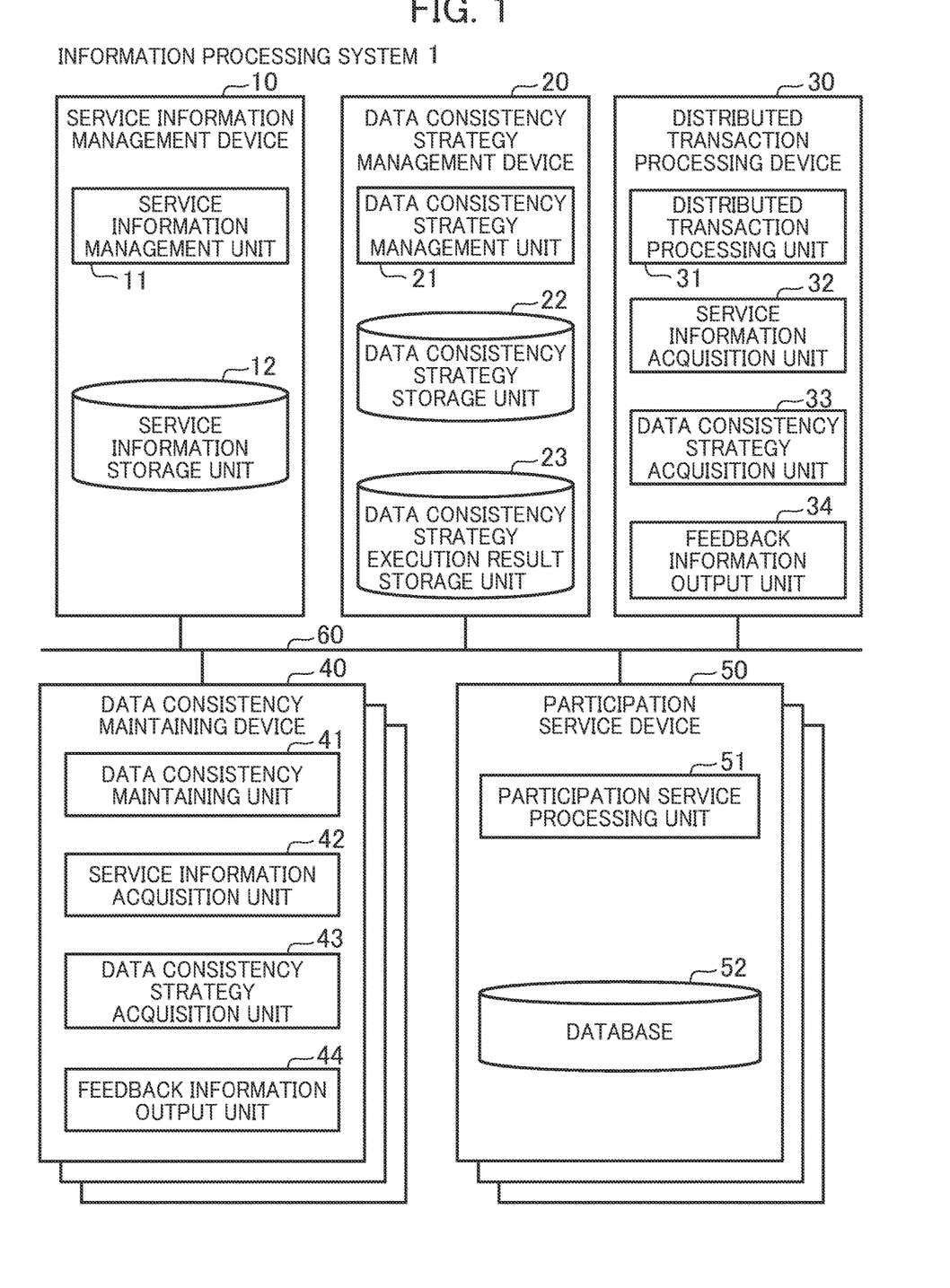
FIG. 1 is a diagram for showing an example of a schematic configuration of an information processing system according to an embodiment.

FIG. 1 is a diagram for showing a schematic configuration of an information processing system that is an example of a distributed transaction system according to the embodiment.

An information processing system 1 of the embodiment includes a service information management device 10, a data consistency strategy management device 20, a distributed transaction processing device 30, a data consistency maintaining device 40, and a participation service device 50.

Figure 2:
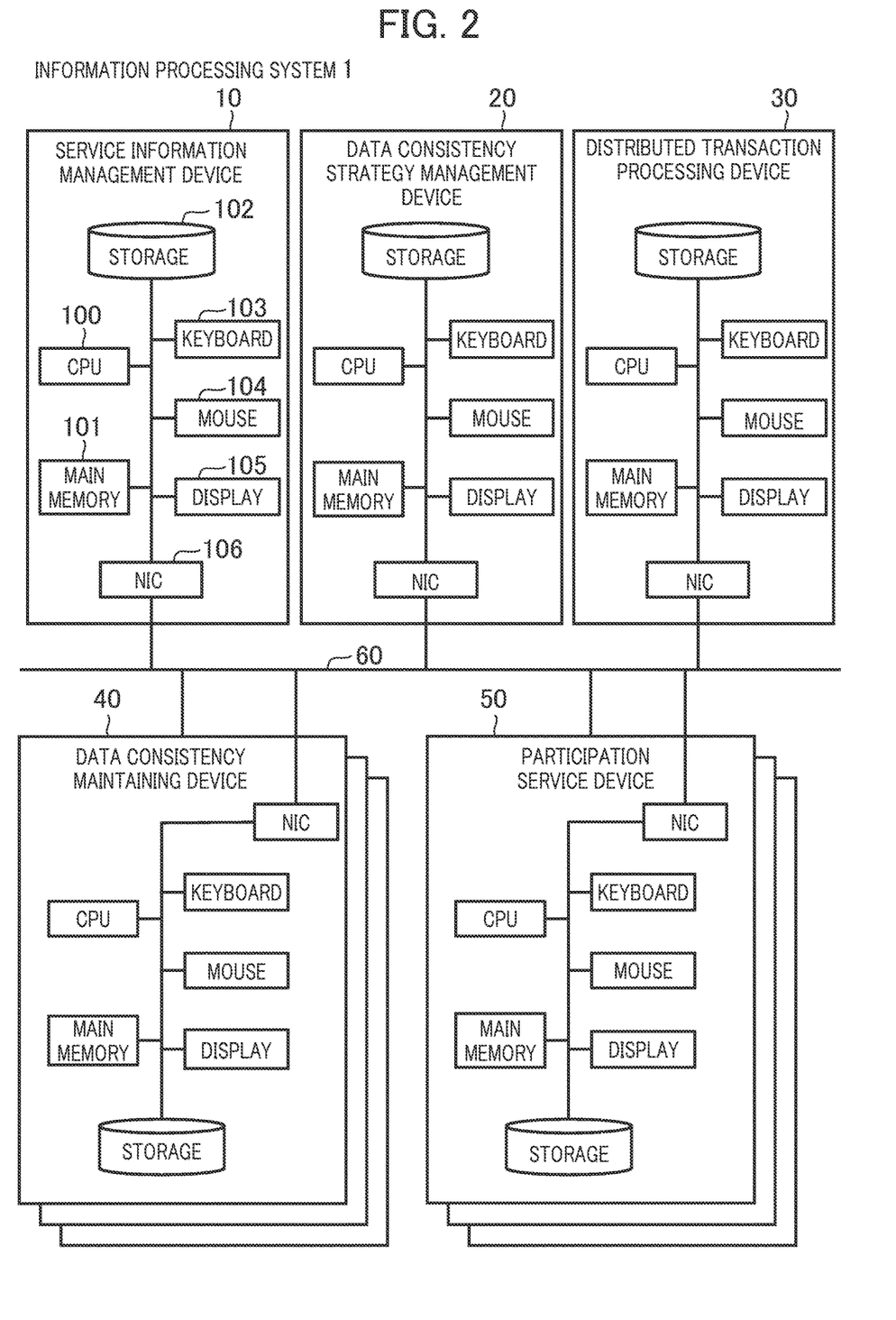
FIG. 2 is a diagram for showing an example of a hardware configuration of the information processing system according to the embodiment.

Although a plurality of participation service devices 50 exists in the embodiment, the configuration of only one of them is shown in FIG. 1 (and FIG. 2). Each participation service device 50 executes at least one local transaction by an instruction from the distributed transaction processing device 30. The local transaction is executed by a participation service processing unit 51 of the participation service device 50, and data and the like necessary for executing the local transaction are stored in a database 52.

The service information management device 10 is a device for managing (micro) services provided by each of the devices 20 to 50 existing in the information processing system 1, the actual operation is executed by a service information management unit 11, and service information that is information relating to services provided by each of the devices 20 to 50 is stored in a service information storage unit 12.

The data consistency strategy management device 20 manages a data consistency strategy that describes a strategy relating to data consistency maintenance in the system. Specifically, the data consistency strategy management device 20 stores the data consistency strategy provided (input) by a user, outputs the same upon request, and also stores the execution result of the data consistency strategy. The management process of the data consistency strategy is performed by a data consistency strategy management unit 21, the data consistency strategy is stored in a data consistency strategy storage unit 22, and the execution result of the data consistency strategy is stored in a data consistency strategy execution result storage unit 23.

When the user instructs to execute a distributed transaction, the distributed transaction processing device 30 instructs each participation service device 50 to execute a local transaction to execute the distributed transaction. Then, after the execution of the distributed transaction, an inquiry is made to the data consistency strategy management device 20 and the service information management device 10, and feedback information relating to the data consistency maintenance is output on the basis of on the data consistency strategy, the service information, and the execution result. The distributed transaction process is executed by a distributed transaction processing unit 31, a process for acquiring the service information from the service information management device 10 is performed by a service information acquisition unit 32, a process for acquiring the data consistency strategy from the data consistency strategy management device 20 is performed by a data consistency strategy acquisition unit 33, and a feedback information output process is performed by a feedback information output unit 34.

The data consistency maintaining device 40 performs a data consistency maintaining process of the local transaction executed by the participation service device 50. The data consistency maintaining process described herein includes Reconcile and the like. In addition, the data consistency maintaining device acquires feedback information from the distributed transaction processing device 30 and executes a process relating to data consistency maintenance. Although a plurality of data consistency maintaining devices 40 exists in the embodiment, the configuration of only one of them is shown in FIG. 1 (and FIG. 2). The data consistency maintaining process is executed by a data consistency maintaining unit 41, the process for acquiring the service information from the service information management device 10 is executed by a service information acquisition unit 42, the process for acquiring the data consistency strategy from the data consistency strategy management device 20 is executed by a data consistency strategy acquisition unit 43, and the process for outputting the feedback information to the user is executed by a feedback information output unit 44.

FIG. 2 is a diagram for showing an example of a hardware configuration of the information processing system 1 according to the embodiment. Since the devices 10 to 50 configuring the information processing system 1 have the same configuration, the service information management device 10 will be described as an example.

The service information management device 10 is configured using a device capable of performing various kinds of information processing. The service information management device 10 has a CPU 100 as an example of a processor, a main memory 101, a storage 102, a keyboard 103, a mouse 104, a display 105, and an NIC (Network Interface Controller) 106 as a communication interface device.

As described above, the processor 100 is, for example, a CPU (Central Processing Unit), a GPU (Graphic Processing Unit), an FPGA (Field-Programmable Gate Array), or the like. The main memory 101 is, for example, a semiconductor storage medium such as a RAM (Random Access Memory) or a ROM (Read Only Memory). As described above, the storage 102 has, for example, a magnetic storage medium such as an HDD (Hard Disk Drive). In addition, a combination of an optical disk such as a DVD (Digital Versatile Disk) and an optical disk drive is also used as the storage 102. Other than the above, a known storage medium such as a magnetic tape medium is also used as the storage 102.

A program such as firmware is stored in the storage 102. When the operation of the service information management device 10 is started (for example, when the power is turned on), a program such as firmware is read from the storage 102, and is executed by being developed in the main memory 101 to perform the entire control of the service information management device 10. In addition, data and the like necessary for each process of the service information management device 10 are stored in the storage 102 other than the program.

The devices 10 to 50 configuring the information processing system 1 are connected to each other by a network 60 and can communicate with each other.

Next, an operation of the information processing system 1 of the embodiment will be described with reference to a sequence diagram of FIG. 3 and FIG. 4 to FIG. 12.

Figure 3:
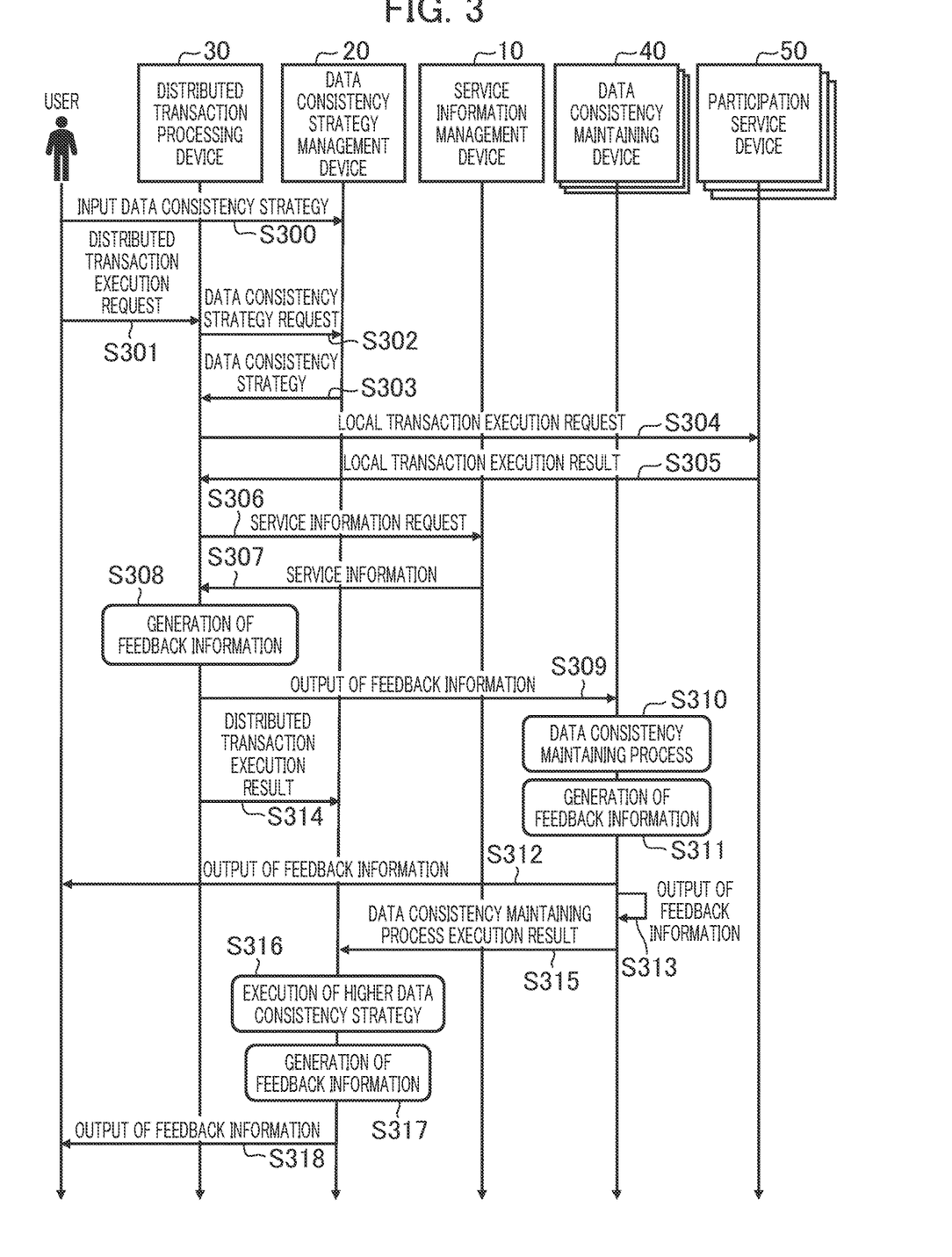
FIG. 3 is a sequence diagram for showing an example of an operation of the information processing system according to the embodiment.

First, the user inputs a data consistency strategy (Step S300). The input data consistency strategy is stored in the data consistency strategy storage unit 22 of the data consistency strategy management device 20.

Figure 5:
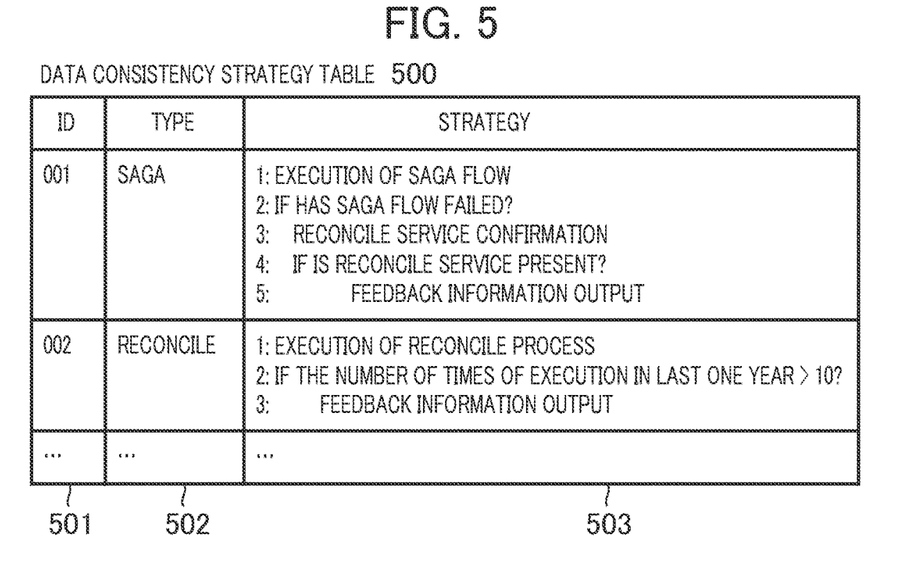
FIG. 5 is a diagram for showing an example of a data consistency strategy table of the information processing system according to the embodiment.

FIG. 5 is a diagram for showing an example of a data consistency strategy table 500 stored in the data consistency strategy storage unit 22 of the data consistency strategy management device 20.

The data consistency strategy table 500 has an ID 501, a Type 502, and a Strategy 503 as entries. The ID 501 is an ID for identifying an individual data consistency strategy, the Type 502 is the type of each service in which the data consistency strategy is executed, and the Strategy 503 is the concrete content of the data consistency strategy executed in the service identified by the Type 502.

Figure 4:
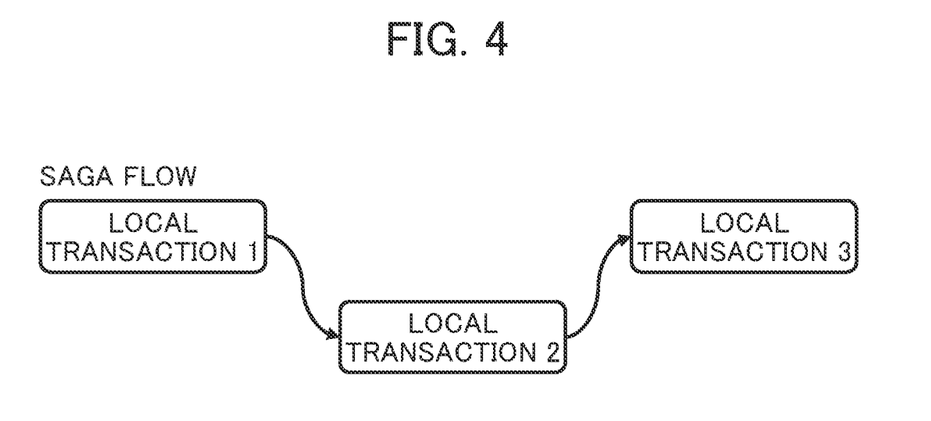
FIG. 4 is a diagram for explaining an example of a Saga pattern.

Here, the Saga flow described in the Strategy 503 of the data consistency strategy table 500 will be described with reference to FIG. 4. As described above, the Saga flow describes each local transaction as a workflow. In the example shown in FIG. 4, local transactions are executed in the order of a local transaction 1, a local transaction 2, and a local transaction 3. The individual local transaction is executed by at least one participation service device 50 as also described above, and the individual local transaction is preferably executed by one participation service device 50.

Figure 6:
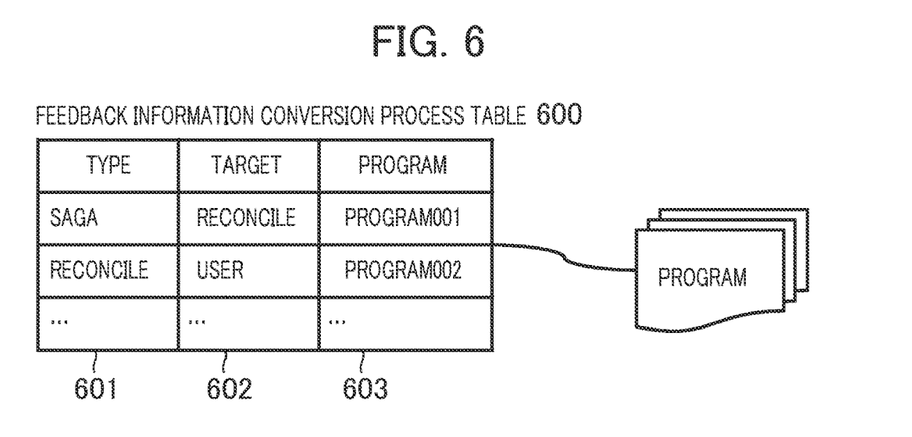
FIG. 6 is a diagram for showing an example of a feedback information conversion process table of the information processing system according to the embodiment.

In addition, the data consistency strategy stored in the data consistency strategy storage unit 22 of the data consistency strategy management device 20 may include a feedback information conversion process table 600 shown in FIG. 6.

Figure 7:
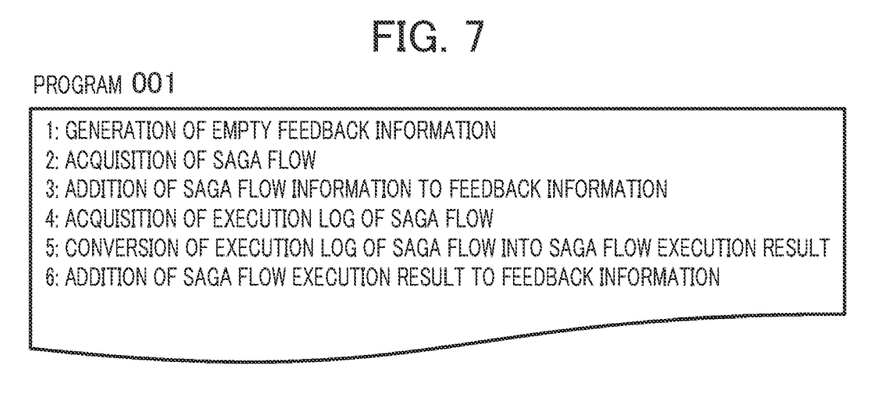
FIG. 7 is a diagram for showing an example of the content of the feedback information conversion process table of the information processing system according to the embodiment.

The feedback information conversion process table 600 shown in FIG. 6 has a Type 601, a Target 602, and a Program 603 as entries. The Type 601 is the type of service to be executed, the Target 602 is the output destination of the service identified by the Type 601, and the Program 603 is a program and a conversion process to be performed in an output information conversion process of the feedback information. FIG. 7 shows an example of the concrete content of the Program 603.

Returning to FIG. 3, the user instructs the distributed transaction processing device 30 to execute the distributed transaction (Step S301). The distributed transaction processing device 30 requested to execute the distributed transaction requests the data consistency strategy management device 20 to output the data consistency strategy stored in the data consistency strategy management device 20 (Step S302). In response to the request from the distributed transaction processing device 30, the data consistency strategy management device 20 sends the data consistency strategy (data consistency strategy table 500) to the distributed transaction processing device 30 (Step S303).

Next, the distributed transaction processing device 30 requests each participation service device 50 to execute a local transaction while referring to the data consistency strategy obtained in Step S303 (Step S304), and the participation service device 50 executes the local transaction on the basis of the request from the distributed transaction processing device 30 and returns the execution result to the distributed transaction processing device 30 (Step S305).

Next, the distributed transaction processing device 30 requests the service information management device 10 for service information (Step S306), and the service information management device 10 sends the service information stored in the service information storage unit 12 to the distributed transaction processing device 30 (Step S307).

Figure 10:
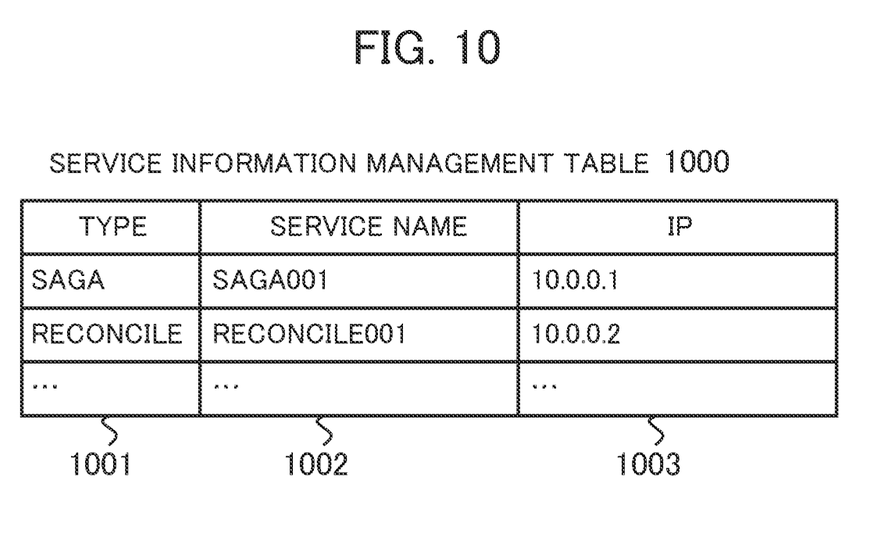
FIG. 10 is a diagram for showing an example of a service information management table of the information processing system according to the embodiment.

FIG. 10 is a diagram for showing an example of service information (service information management table) 1000 stored in the service information storage unit 12 of the service information management device 10.

The service information management table 1000 has a Type 1001, a Service Name 1002, and an IP 1003 as entries. The Type 1001 is the type of service, the Service Name 1002 is the name of the service described in the Type 1001, and the IP 1003 is the IP address in the information processing system 1 where the service is located.

Next, the feedback information output unit 34 of the distributed transaction processing device 30 generates feedback information (Step S308), and outputs the generated feedback information to the data consistency maintaining device 40 (Step S309). The details of the feedback information will be described later. Accordingly, the feedback information is sequentially generated every time the local transaction is executed.

The data consistency maintaining device 40 executes the data consistency strategy defined in the data consistency strategy table 500 from a combination of the Type 501 and the Strategy 503 of the data consistency strategy table 500 (Step S310). It should be noted that the execution timing of the data consistency strategy is not limited to this timing, and the data consistency strategy may be executed at the timing of system update, for example, in the case of a test. Next, the data consistency maintaining device 40 refers to the Type 601 and the Target 602 of the feedback information conversion process table 600, identifies the Program 603 identified by the combination, and executes the Program 603. Then, the data consistency maintaining device 40 generates feedback information on the basis of the execution result of the Program 603 (Step S311), and outputs the feedback information to the user and other data consistency maintaining devices 40 (Steps S312 and S313).

On the other hand, the distributed transaction processing device 30 outputs the execution result of the distributed transaction to the data consistency strategy management device 20 (Step S314).

Thereafter, the data consistency maintaining device 40 outputs the execution result of the data consistency maintaining process, and the execution result of the data consistency maintaining process is stored in the data consistency strategy execution result storage unit 23 of the data consistency strategy management device 20 (Step S315).

Figure 11:
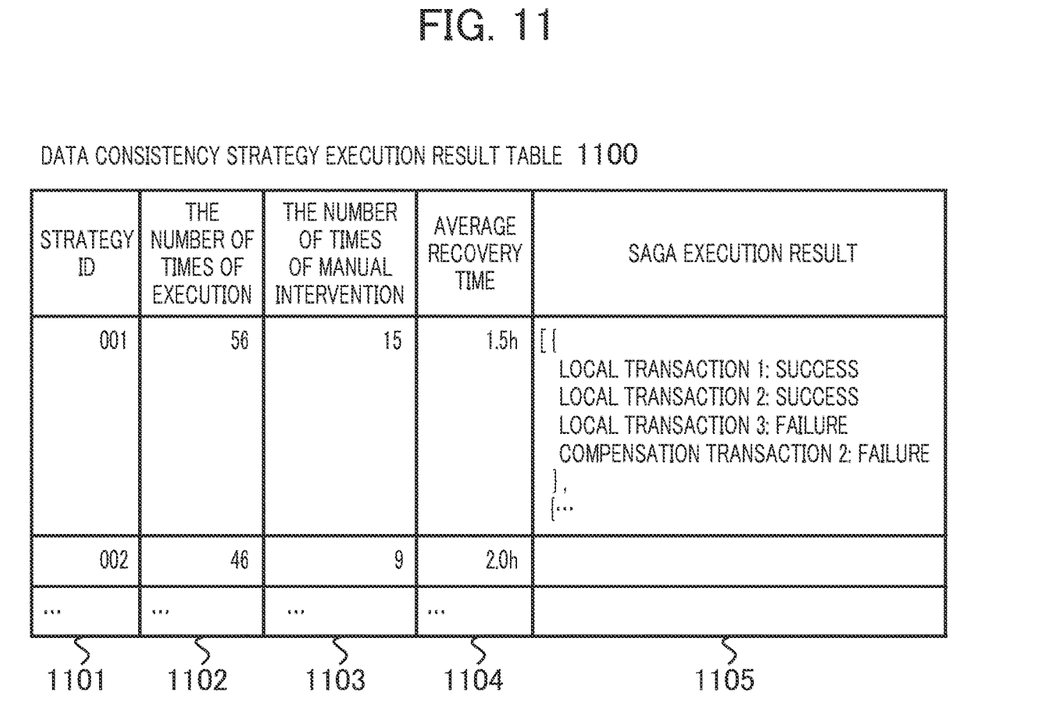
FIG. 11 is a diagram for showing an example of a data consistency strategy execution result table of the information processing system according to the embodiment.

FIG. 11 shows an example of a data consistency strategy execution result (data consistency strategy execution result table) 1100 stored in the data consistency strategy execution result storage unit 23 of the data consistency strategy management device 20.

The data consistency strategy execution result table 1100 shown in FIG. 11 has a strategy ID 1101, the number of times of execution 1102, the number of times of manual intervention 1103, an average recovery time 1104, and a Saga execution result 1105 as entries.

The strategy ID 1101 is the same as the ID 501 of the data consistency strategy table 500, the number of times of execution 1102 is the number of times of execution of the data consistency strategy identified by the strategy ID 1101, the number of times of manual intervention 1103 is the number of times of manual intervention performed by the user as a result of the data consistency maintaining process, the average recovery time 1104 is the time until data consistency is performed as a result of the manual intervention, and the Saga execution result 1105 is the execution result of the latest Saga flow.

Next, the data consistency strategy management device 20 executes a higher data consistency strategy on the basis of a higher data consistency strategy table (Step S316).

Figure 12:
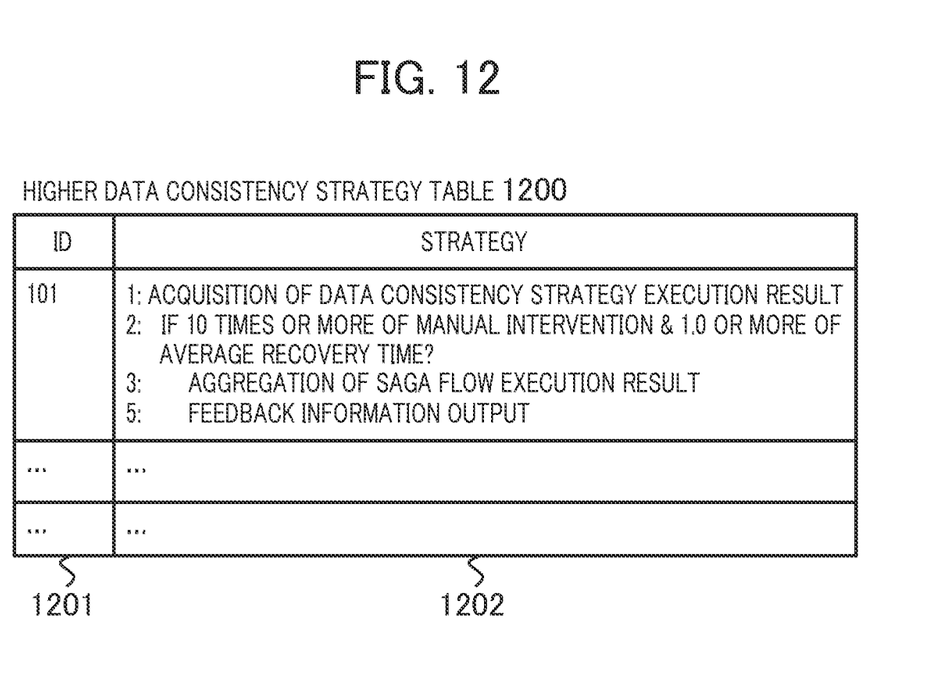
FIG. 12 is a diagram for showing an example of a higher data consistency strategy table of the information processing system according to the embodiment.

FIG. 12 is a diagram for showing an example of a higher data consistency strategy table 1200. The higher data consistency strategy table 1200 has an ID 1201 and a Strategy 1202 as entries.

A concrete example of the higher data consistency strategy executed by the data consistency strategy management device 20 will be described with reference to the Strategy 1202 of the higher data consistency strategy table 1200 shown in FIG. 12.

First, the data consistency strategy management device 20 acquires the data consistency strategy execution result table 1100 stored in the data consistency strategy execution result storage unit 23 of the data consistency strategy management device 20. Next, the data consistency strategy management device 20 determines whether or not there is a (lower) data consistency strategy in which the number of times of manual intervention 1103 is 10 times or more and the average recovery time 1104 is 1.0 hour or more in the acquired data consistency strategy execution result table 1100. Then, if the determination is "yes", the Saga execution results 1105 of the data consistency strategy execution result table 1100 are aggregated to generate feedback information (Step S317 in FIG. 3), and the generated feedback information is output to the user (Step S318).

Figure 8:
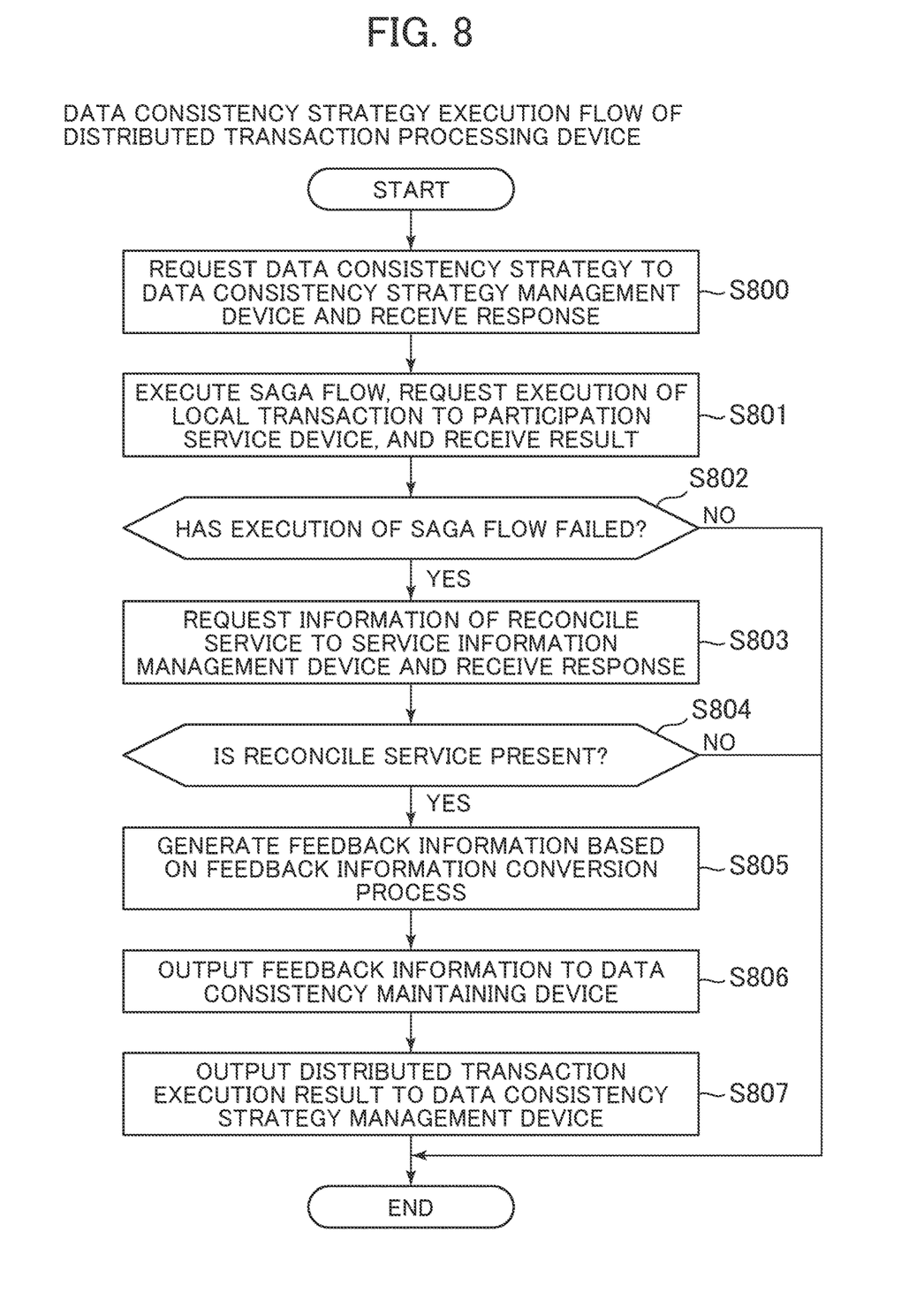
FIG. 8 is a flowchart for showing an example of a data consistency strategy execution process of a distributed transaction management device configuring the information processing system according to the embodiment.

FIG. 8 is a flowchart for showing a data consistency strategy execution process by the distributed transaction processing device 30.

First, the distributed transaction processing device 30 requests the data consistency strategy management device 20 for a data consistency strategy and receives the data consistency strategy from the data consistency strategy management device 20 as a response (Step S800). Next, the distributed transaction processing device 30 executes the Saga flow that is the workflow as shown in, for example, FIG. 4, requests each participation service device 50 to execute the local transactions in the order defined in the workflow, and receives a result from each participation service device 50 (Step S801).

Next, the distributed transaction processing device 30 determines whether or not the execution of the Saga follow that the participation service device 50 is requested to execute has failed (Step S802). Then, if it is determined that the execution of the Saga flow has failed (YES in Step S802), the program proceeds to Step S803. If it is determined that the execution of the Saga flow has succeeded (NO in Step S802), the process shown in the flowchart of FIG. 8 is terminated.

In Step S803, Reconcile service information is requested to the participation service device 50, and the response thereof is received from the participation service device 50.

Next, the distributed transaction processing device 30 determines whether or not there is a Reconcile service in the participation service device 50 (Step S804). Then, if it is determined that there is a Reconcile service (YES in Step S804), the program proceeds to Step S805. If it is determined that there is no Reconcile service (NO in Step S804), the process shown in the flowchart of FIG. 8 is terminated.

In Step S805, the distributed transaction processing device 30 generates feedback information on the basis of the feedback information conversion process (table 600) included in the data consistency strategy. Next, the distributed transaction processing device 30 outputs the feedback information generated in Step S805 to the data consistency maintaining device 40 (Step S806).

Then, the distributed transaction processing device 30 outputs a distributed transaction execution result to the data consistency strategy management device 20 (Step S807).

Figure 9:
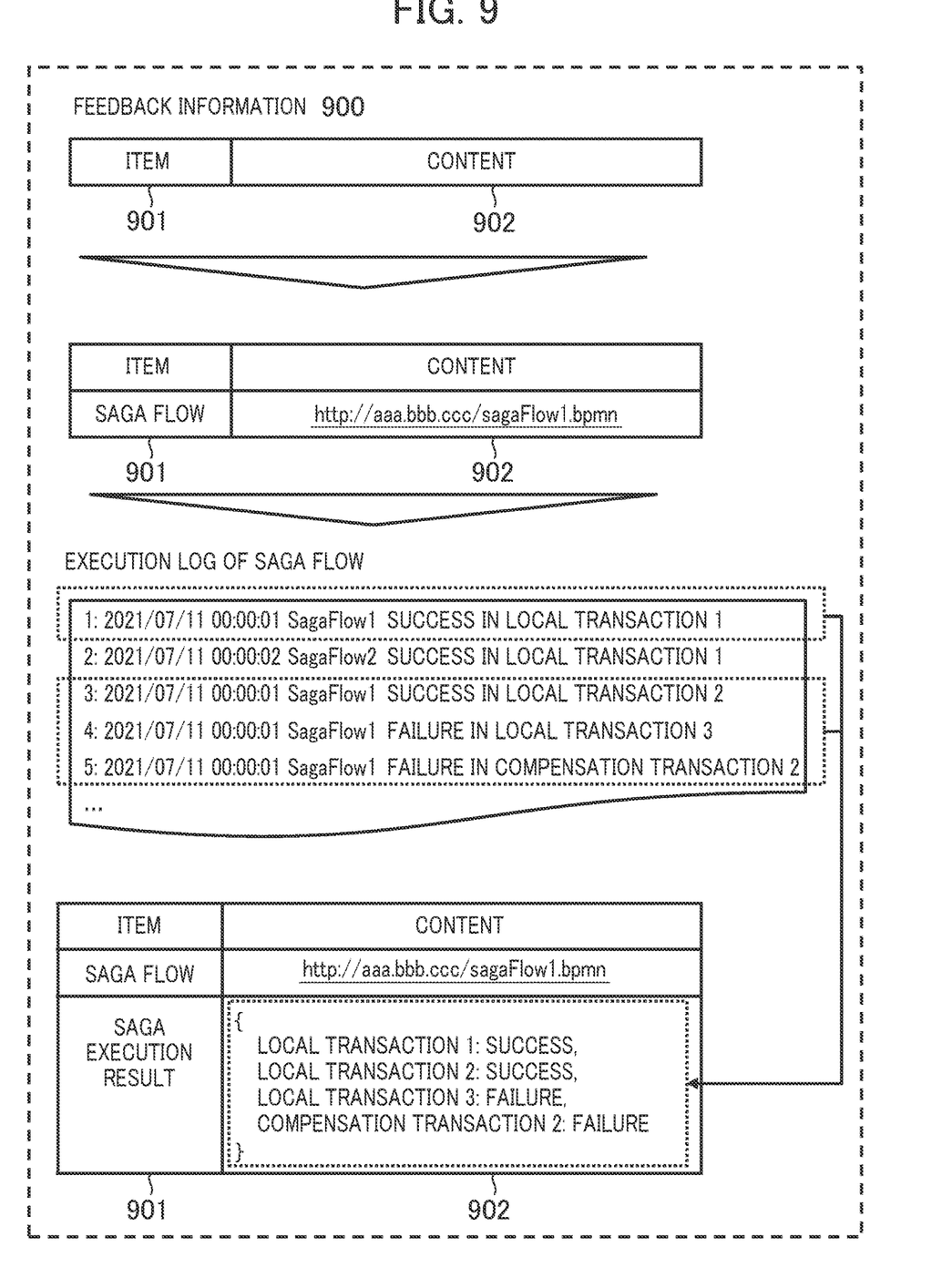
FIG. 9 is a diagram for showing an example of feedback information of the information processing system according to the embodiment.

FIG. 9 is a diagram for showing an example of feedback information.

Feedback information 900 in the embodiment has an Item 901 and a Content 902 as entries. The feedback information 900 of the embodiment relates to data consistency maintenance in the information processing system 1, the Item 901 is a name for identifying the data consistency maintaining process, and the Content 902 is the content of the process identified by the Item 901.

As described above, the distributed transaction processing device 30 acquires the service information (management table 1000) from the service information management device 10, and generates the feedback information 900 on the basis of the service information. More specifically, the distributed transaction processing device 30 refers to the data consistency strategy (table 500), uses the service information (management table 1000) to confirm the presence or absence of a service corresponding to the processing result of the data consistency strategy (table 500), and generates the confirmation result as the feedback information 900. In the example shown in FIG. 9, as shown in the upper center of FIG. 9, the existence of the Saga flow and the location of the Saga flow are described in the feedback information 900.

Next, the data consistency maintaining device 40 receives the feedback information 900 from the distributed transaction processing device 30, performs the data consistency maintaining process, and adds at least a part of the result of the data consistency maintaining process to the feedback information 900. In the example shown in FIG. 9, the data consistency maintaining device 40 refers to the execution log of the Saga flow and adds the execution result of the Saga flow to the feedback information 900.

Therefore, when performing the Reconcile, information necessary for the Reconcile can be obtained by referring to the feedback information 900.

Figure 13:
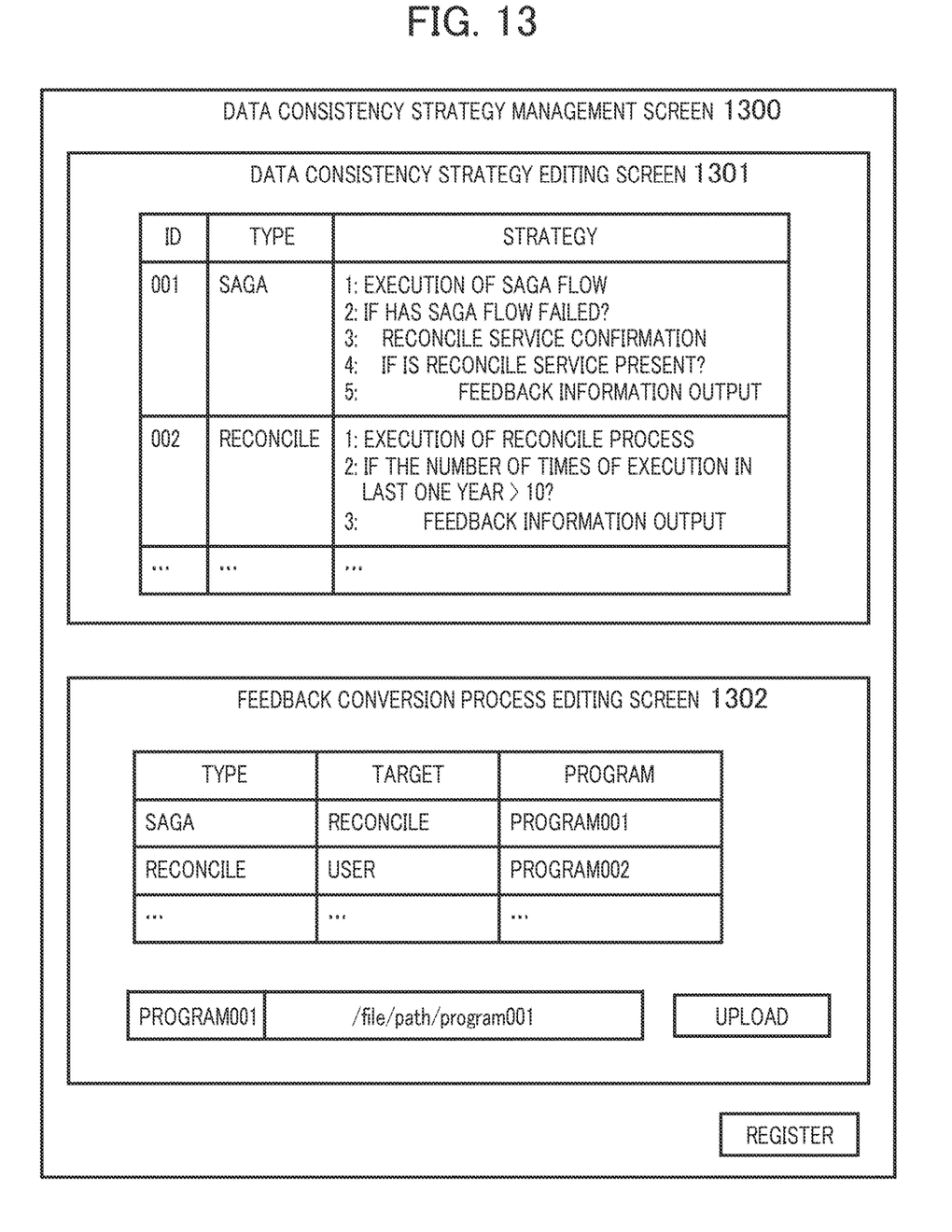
FIG. 13 is a diagram for showing an example of a data consistency strategy management screen of the information processing system according to the embodiment.

FIG. 13 is a diagram for showing an example of an input screen transmitted from the data consistency strategy management device 20 when the user inputs a data consistency strategy into the data consistency strategy management device 20. A data consistency strategy management screen 1300 shown in FIG. 13 has a data consistency strategy editing screen 1301 for inputting the data consistency strategy table 500 and a feedback conversion process editing screen 1302 for inputting the feedback information conversion process table 600.

Figure 14:
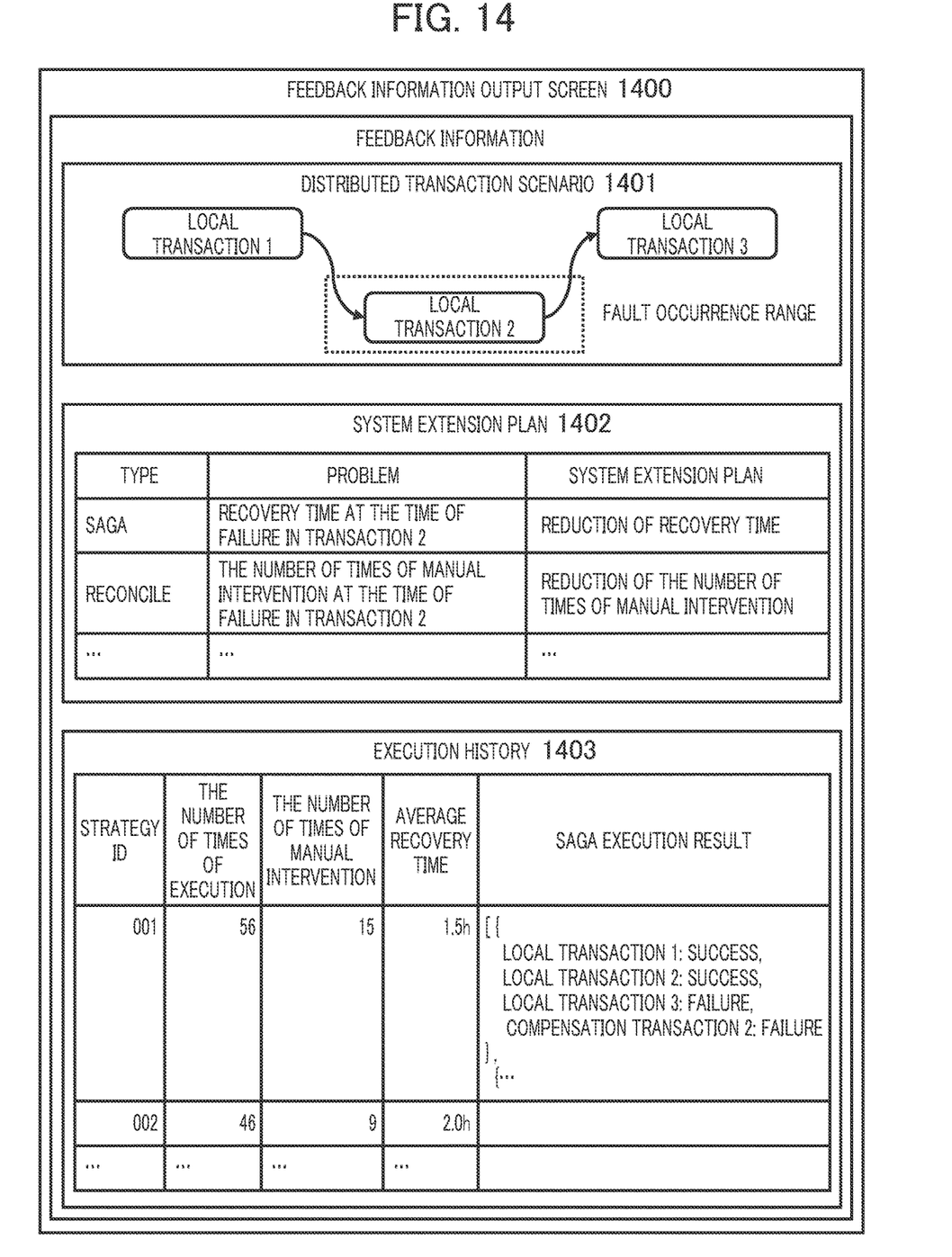
FIG. 14 is a diagram for showing an example of a feedback information output screen of the information processing system according to the embodiment.

FIG. 14 is a diagram for showing an example of an output screen transmitted from the data consistency strategy management device 20 when the user browses the feedback information output from the data consistency strategy management device 20. A feedback information output screen 1400 shown in FIG. 14 has, as feedback information, a distributed transaction scenario screen 1401 for showing a distributed transaction scenario that is a Saga flow and a local transaction where a fault currently occurs, a system extension plan screen 1402 for showing a system extension plan that is the execution result of a higher data consistency strategy, and an execution history screen 1403 for showing the data consistency strategy execution result table 1100.

According to the embodiment thus configured, it is possible to maintain the data consistency of the entire system by maintaining consistent data consistency (appropriately linking existing services with each other) while maintaining loose coupling between services on which each data consistency maintaining technique is implemented (=not assuming the existence of the other party).

It should be noted that the embodiment described above has been described in detail for the purpose of clearly explaining the present invention, and is not necessarily limited to one including all the configurations described above. In addition, some configurations of each embodiment can be added to, deleted from, and replaced by other configurations.

In addition, some or all of the above configurations, functions, processing units, processing means, and the like may be realized by hardware by designing with, for example, integrated circuits. In addition, the present invention can be also realized by a program code of software that realizes the function of the embodiment. In this case, a storage medium in which a program code is recorded is provided to a computer, and a processor provided in the computer reads the program code stored in the storage medium. In this case, the program code itself read from the storage medium realizes the function of the above-described embodiment, and the program code itself and the storage medium storing the same configure the present invention. As a storage medium for supplying such a program code, for example, a flexible disk, a CD-ROM, a DVD-ROM, a hard disk, an SSD (Solid State Drive), an optical disk, a magneto-optical disk, a CD-R, a magnetic tape, a nonvolatile memory card, a ROM, or the like is used.

In addition, the program code realizing the function described in the embodiment can be implemented by a wide range of program or script languages such as assembler, C/C++, perl, Shell, PHP, Java (registered trademark), Python, and the like.

In the embodiment described above, the control lines and the information lines considered to be necessary in the explanation are shown, but all the control lines and the information lines in a product are not necessarily shown. Almost all the configurations may be connected to each other.

What is claimed is:

1. A distributed transaction system that is configured using one or more devices and a network communicatively connecting the devices to each other and provides distributed transactions between the devices, the system comprising:
    a service information management device that manages a service provided by each device existing in the distributed transaction system as service information;
    a data consistency strategy management device that manages and stores a plurality of data consistency strategies each indicating a strategy relating to data consistency maintenance in the distributed transaction system, each data consistency strategy including a type of service in which the respective data consistency strategy is executed, the steps of the individual data consistency strategy, an output destination of the service, and a program and a conversion process to be performed in an output information conversion process of feedback information relating to data consistency maintenance;
    a distributed transaction processing device that executes a distributed transaction, inquires the data consistency strategy management device and the service information management device after the execution of the distributed transaction, and outputs the feedback information relating to data consistency maintenance on the basis of the data consistency strategy, the service information, and the execution result of the distributed transaction; and
    a plurality of data consistency maintaining devices that acquire the feedback information relating to data consistency maintenance,
    wherein at least one of the data consistency maintaining devices performs steps of:
    executing at least one of the data consistency strategies identified based on a combination of the type of service and the steps of the individual data consistency strategy,
    identifying a respective program and conversion process based on the type of the service and the output destination of the service,
    executing the respective program and conversion process,
    generating feedback information on the basis of the execution result of the respective program and conversion process, and
    outputting the generated feedback information to other data consistency maintaining devices, wherein the generated feedback information identifies the service type and the respective consistency strategy.

2. The distributed transaction system according to claim 1,
    wherein the data consistency strategy management device manages a lower data consistency strategy corresponding to each distributed transaction process and a higher data consistency strategy for controlling an output of the generated feedback information relating to a change in the system configuration by using an execution result on the basis of the lower data consistency strategy.

3. The distributed transaction system according to claim 1,
    wherein the process of the data consistency maintaining device is at least one of reconciling, a test, and fault injection.

4. The distributed transaction system according to claim 1,
    wherein the at least one of the data consistency maintaining devices is configured to output the generated feedback information to a user.

5. A distributed transaction processing method in a distributed transaction system that is configured using one or more devices and a network communicatively connecting the devices to each other and provides distributed transactions between the devices, the method comprising the steps of:
    managing a service provided by each device existing in the distributed transaction system as service information;
    managing and storing a plurality of data consistency strategies each indicating a strategy relating to data consistency maintenance in the distributed transaction system, each data consistency strategy including a type of service in which the respective data consistency strategy is executed, the steps of the individual data consistency strategy, an output destination of the service, and a program and a conversion process to be performed in an output information conversion process of the feedback information relating to data consistency maintenance;
    executing a distributed transaction and outputting, after the execution of the distributed transaction, the feedback information relating to data consistency maintenance on the basis of the data consistency strategy, the service information, and the execution result of the distributed transaction; and
    acquiring, by a plurality of data consistency maintaining devices, the feedback information relating to data consistency maintenance,
    wherein at least one of the data consistency maintaining devices executes steps comprising:
    executing at least one of the data consistency strategies identified based on a combination of the type of service and the steps of the individual data consistency strategy,
    identifying a respective program and conversion process based on the type of the service and the output destination of the service,
    executing the respective program and conversion process,
    generating feedback information on the basis of the execution result of the respective program and conversion process, and
    outputting the generated feedback information to other data consistency maintaining devices, wherein the generated feedback information identifies the service type and the respective consistency strategy.

6. The distributed transaction processing method in the distributed transaction system according to claim 5, wherein a lower data consistency strategy corresponding to each distributed transaction process and a higher data consistency strategy for controlling an output of feedback information relating to a change in the system configuration by using an execution result on the basis of the lower data consistency strategy are managed.

7. The distributed transaction processing method in the distributed transaction system according to claim 5, wherein the process of the data consistency maintaining device is at least one of reconciling, a test, and fault injection.

8. The distributed transaction processing method in the distributed transaction system according to claim 5, wherein the at least one of the data consistency maintaining devices is configured to output the generated feedback information to a user.

* * * * *